(12) United States Patent
Schornig et al.

(10) Patent No.: US 12,526,198 B2
(45) Date of Patent: Jan. 13, 2026

(54) QoE OPTIMIZED ELASTIC CLOUD NETWORKS

(71) Applicant: Cisco Technology, Inc., San Jose, CA (US)

(72) Inventors: Eduard Schornig, Haarlem (NL); Jean-Philippe Vasseur, Combloux (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/588,666

(22) Filed: Feb. 27, 2024

(65) Prior Publication Data

US 2025/0274347 A1   Aug. 28, 2025

(51) Int. Cl.
*G06F 15/173* (2006.01)
*H04L 41/0894* (2022.01)
*H04L 41/12* (2022.01)
*H04L 41/22* (2022.01)

(52) U.S. Cl.
CPC .......... *H04L 41/12* (2013.01); *H04L 41/0894* (2022.05); *H04L 41/22* (2013.01)

(58) Field of Classification Search
CPC ...... H04L 41/12; H04L 41/0894; H04L 41/22
See application file for complete search history.

(56) References Cited

U.S. PATENT DOCUMENTS

| | | | |
|---|---|---|---|
| 10,079,734 | B1 | 9/2018 | Gegout et al. |
| 2017/0244607 | A1* | 8/2017 | Dujodwala ......... H04L 41/5025 |
| 2019/0222491 | A1* | 7/2019 | Tomkins ............. H04L 41/0823 |
| 2022/0052905 | A1 | 2/2022 | Vasseur et al. |
| 2022/0141715 | A1 | 5/2022 | Mayor et al. |
| 2023/0082301 | A1 | 3/2023 | Junkins et al. |

FOREIGN PATENT DOCUMENTS

CN            117099082 A         11/2023

* cited by examiner

*Primary Examiner* — Joseph R Maniwang
(74) *Attorney, Agent, or Firm* — Merchant & Gould P.C.

(57) ABSTRACT

In one embodiment, a device obtains information regarding a plurality of network nodes of a network via which an online application is accessed. The device uses a prediction model to predict a quality of experience metric for the online application. The device determines, a topology change for the network, based on the quality of experience metric predicted for the online application and the information regarding the plurality of network nodes. The device causes the topology change to be implemented in the network.

20 Claims, 12 Drawing Sheets

QoE OPTIMIZED ELASTIC CLOUD NETWORKS

TECHNICAL FIELD

The present disclosure relates generally to computer networks, and, more particularly, to quality of experience (QoE) optimized elastic cloud networks.

BACKGROUND

In recent years, enterprise environments have undergone a fundamental transformation driven by both advances in technology and social factors, resulting in users and applications becoming increasingly distributed and diverse. Critical business applications commonly run in a software-, platform-, or infrastructure-as-a-service model (XaaS) and are delivered from public or private cloud infrastructure. In addition, the wide adoption of remote and hybrid work practices along with the advent of shared or temporary office space providers mean that users can now work from an increasing number of diverse locations.

Application performance and user quality of experience (QoE) are top-of-mind concerns for network administrators. However, the current set of network solutions and practices have been slow to adapt to this new highly dynamic environment. Indeed, in the case of remote workers, traffic for business applications is often routed through a small number of corporate virtual private network (VPN) gateways located in a data centers or hub locations. This type of solution may often see user QoE being impacted by suboptimal gateway placement or capacity issues caused by the system being unable to quickly scale up to meet traffic demands.

Recent approaches to ensure satisfactory application QoE have focused on service level agreement (SLA) monitoring and application aware routing, which seek to optimize network connectivity from the perspective of Layer 3 network metrics (e.g., loss, latency, and jitter). However, these approaches: 1.) fail to account for the fact that Layer 3 metrics are often not representative of the true QoE of an application and 2.) are limited to optimizing the traffic in the confines of the existing network topology/available nodes.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains information regarding a plurality of network nodes of a network via which an online application is accessed. The device uses a prediction model to predict a quality of experience metric for the online application. The device determines, a topology change for the network, based on the quality of experience metric predicted for the online application and the information regarding the plurality of network nodes. The device causes the topology change to be implemented in the network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
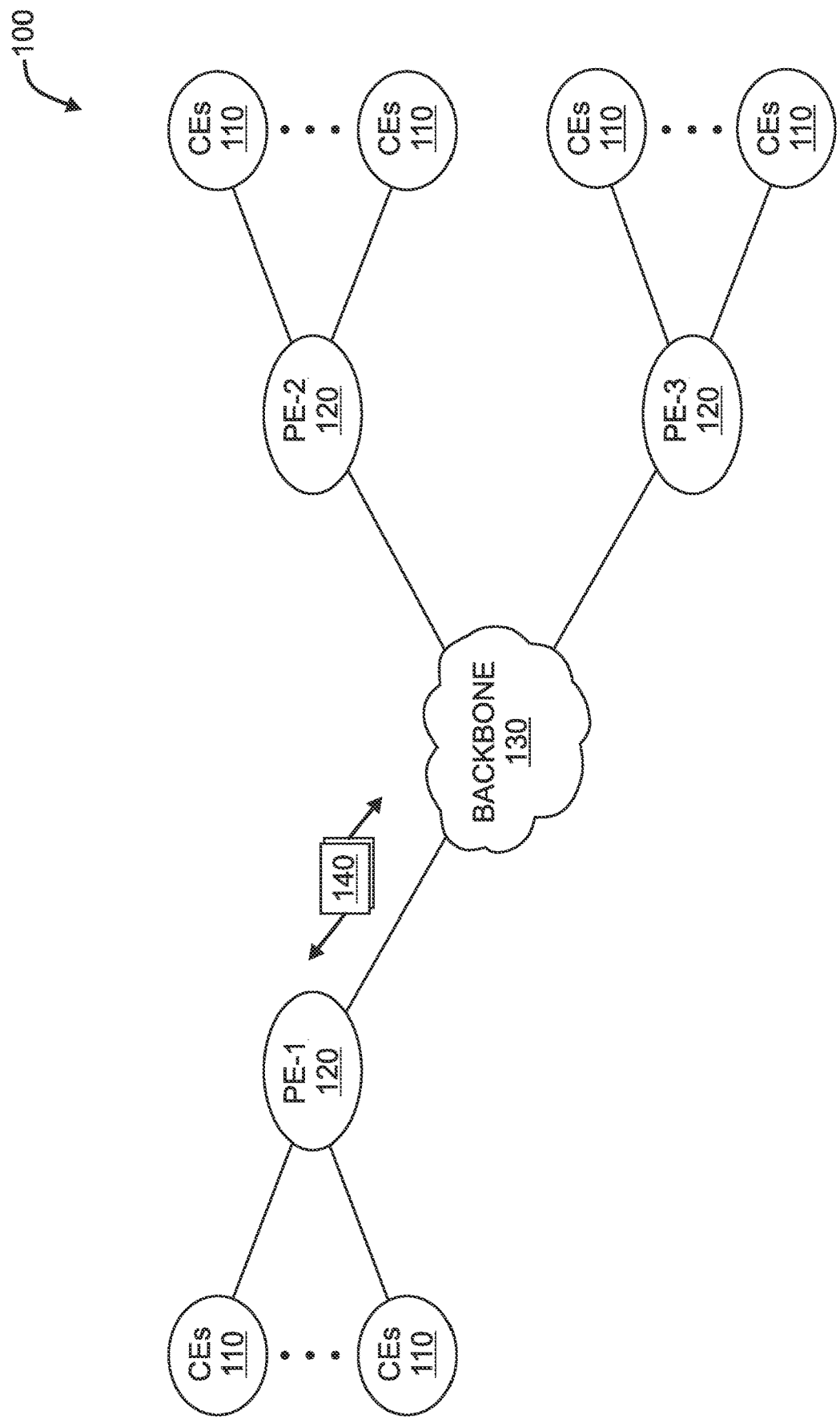
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
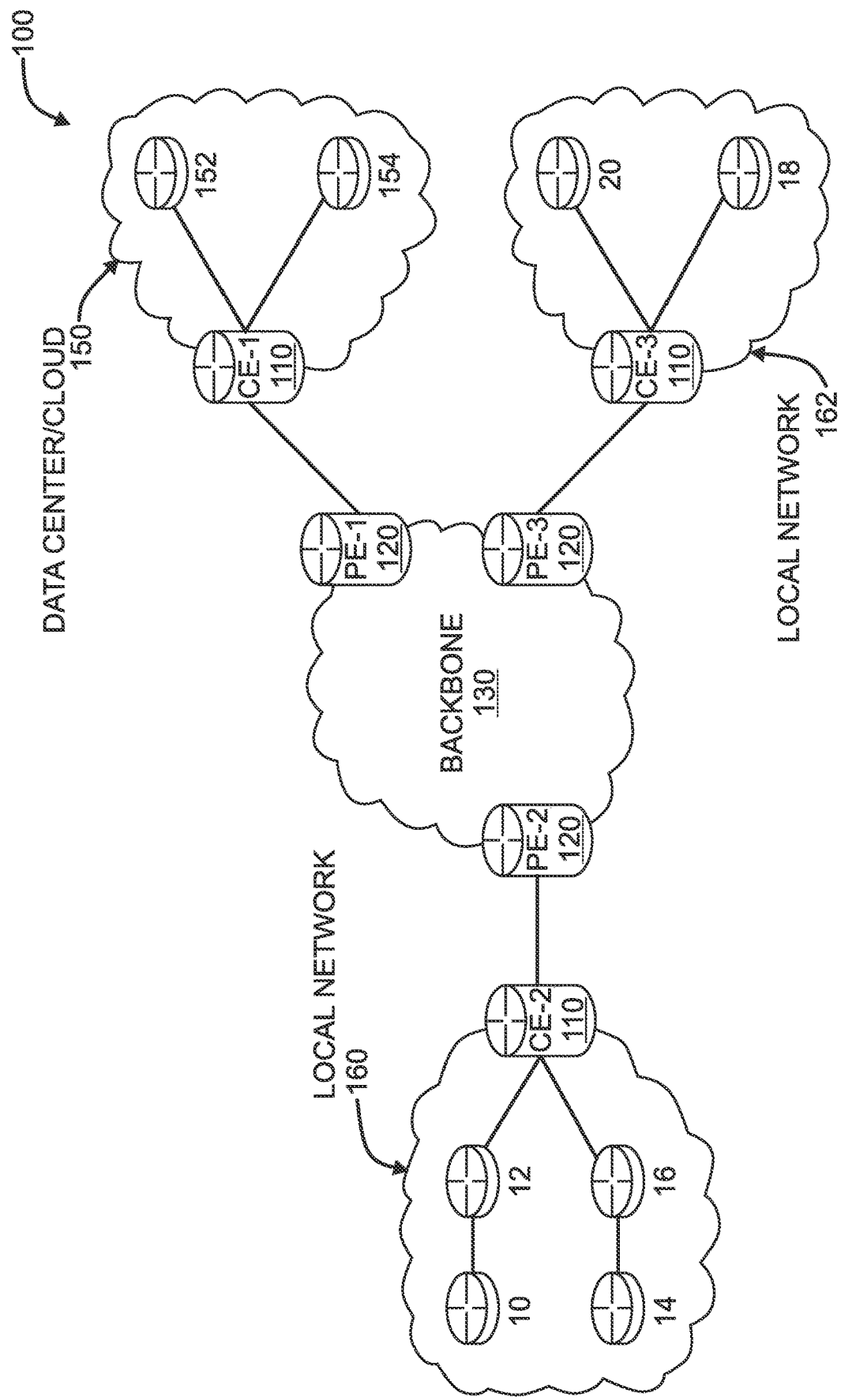

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
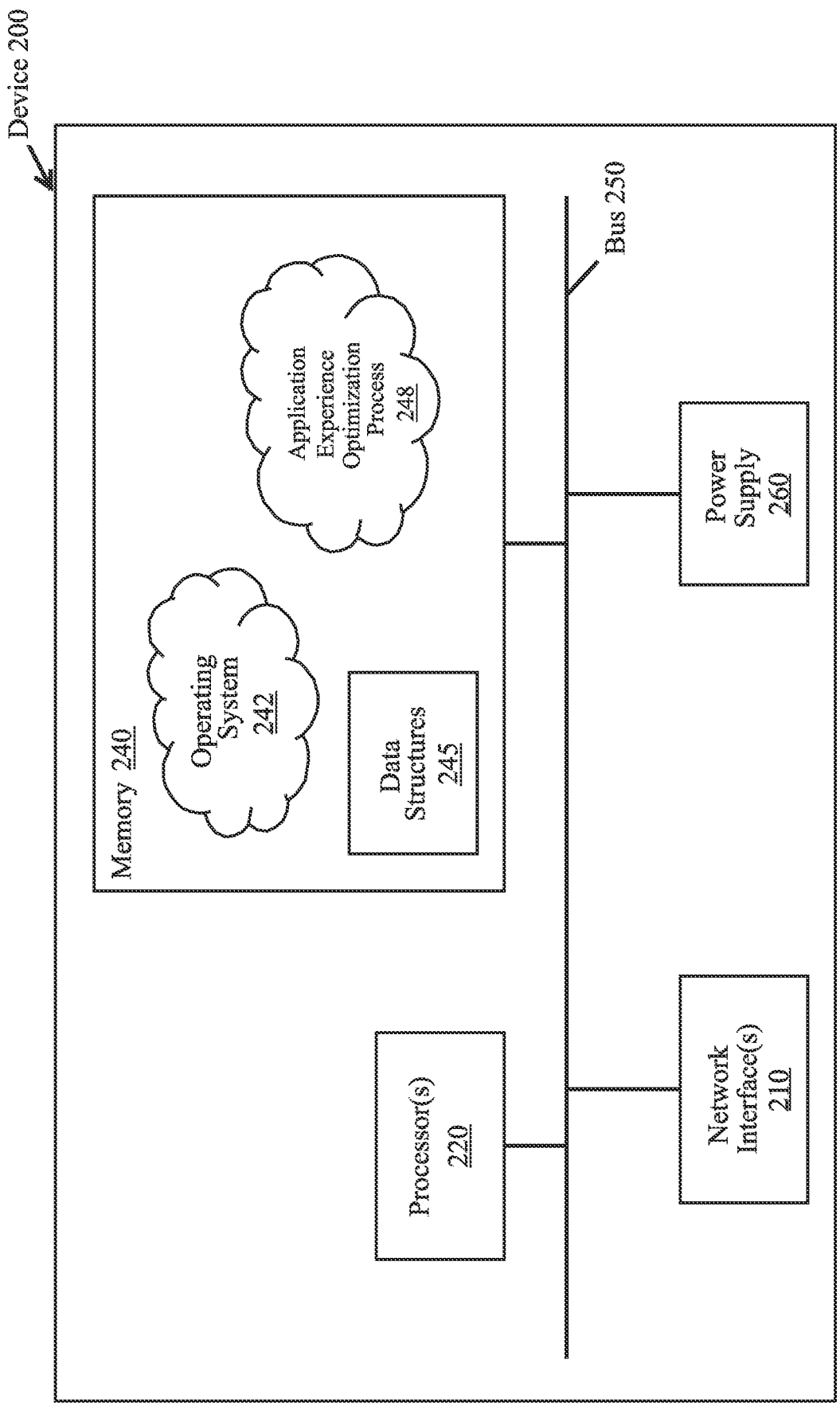
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators) and recognize complex patterns in these data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, application experience optimization process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, application experience optimization process 248 may use a generative model to generate synthetic network traffic based on existing user traffic to test how the network reacts.

Example generative approaches can include, but are not limited to, generative adversarial networks (GANs), large language models (LLMs), other transformer models, and the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
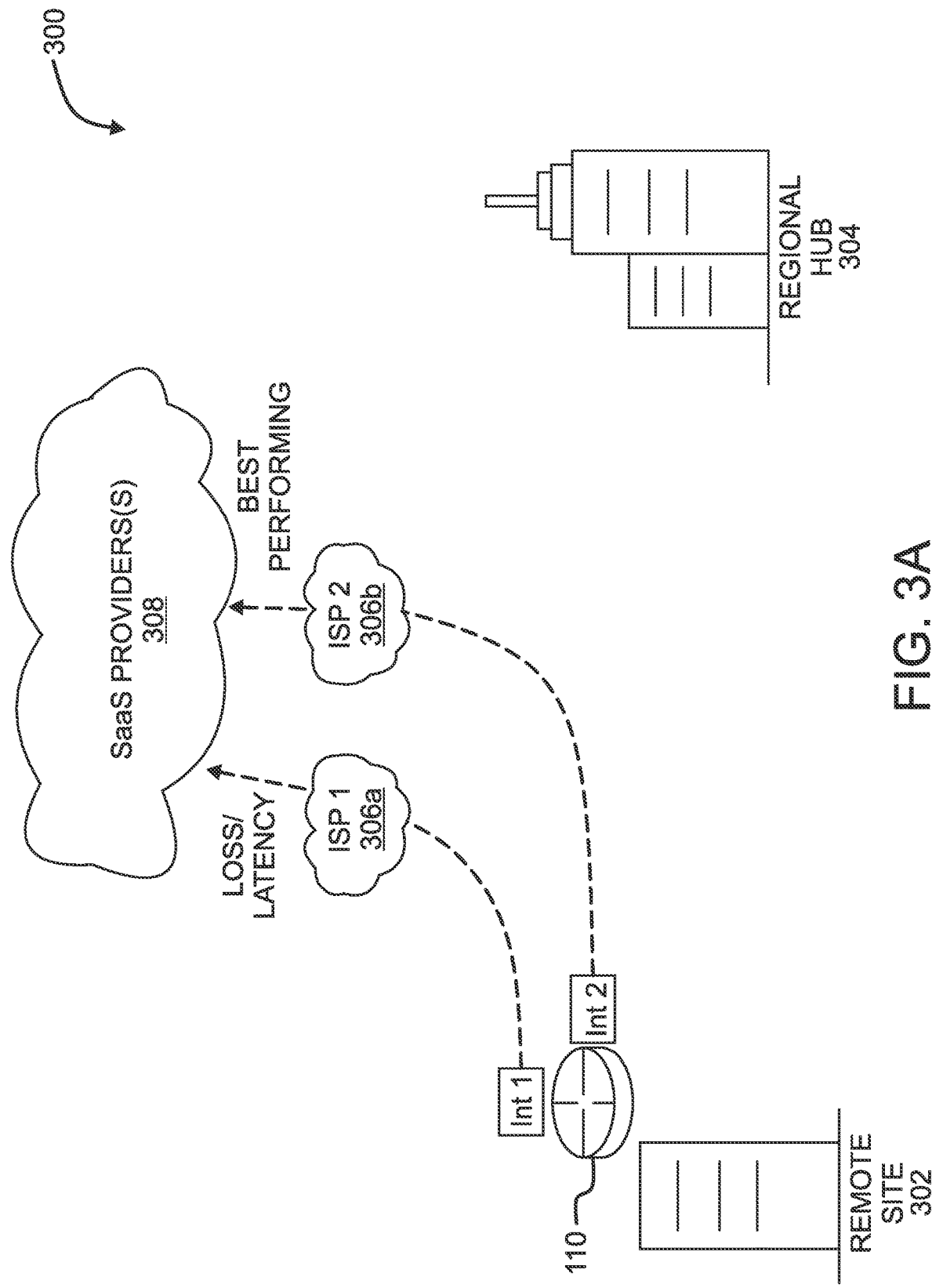
FIGS. 3A-3B illustrate example network deployments.
Figure 3B:
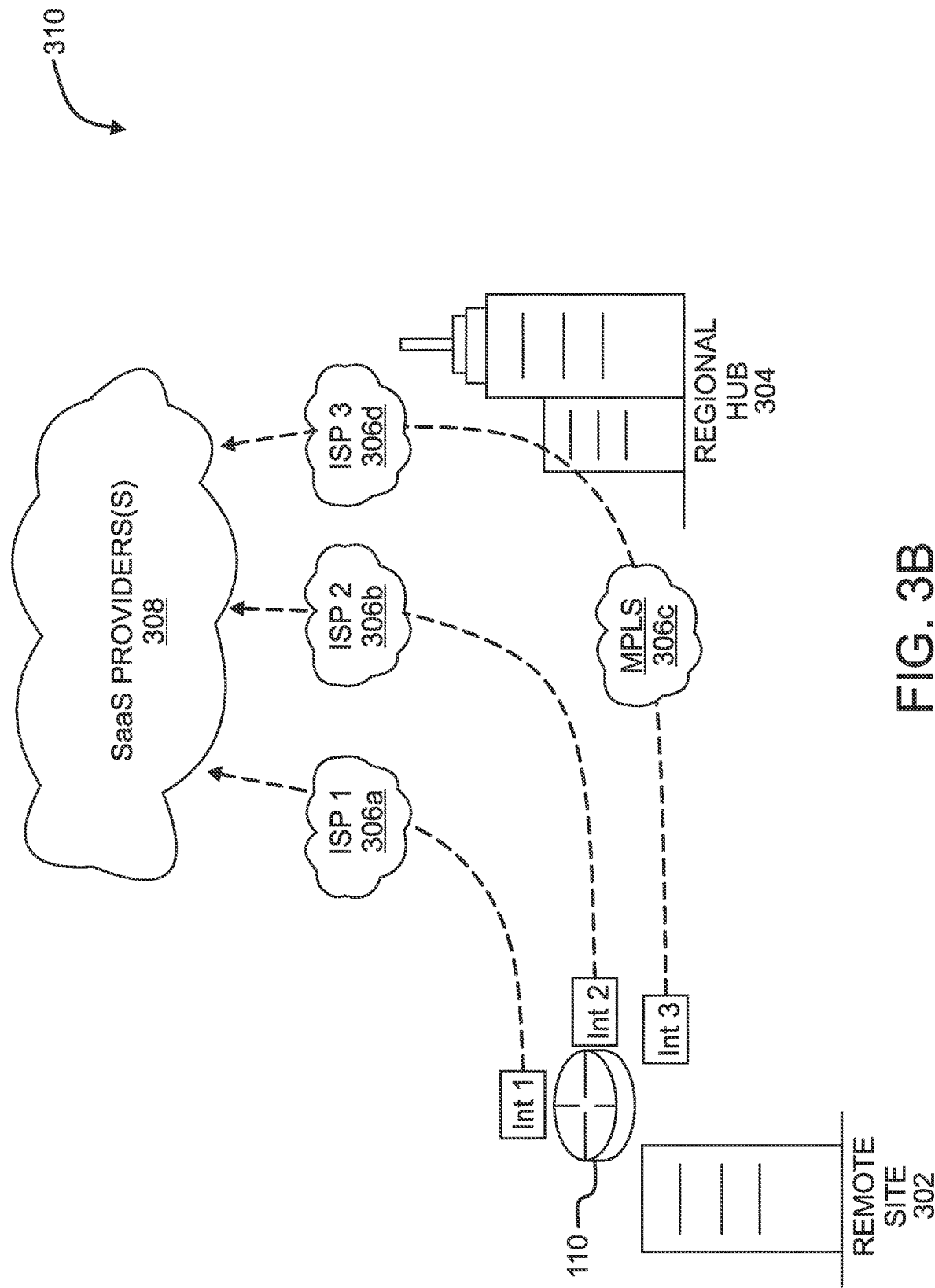

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
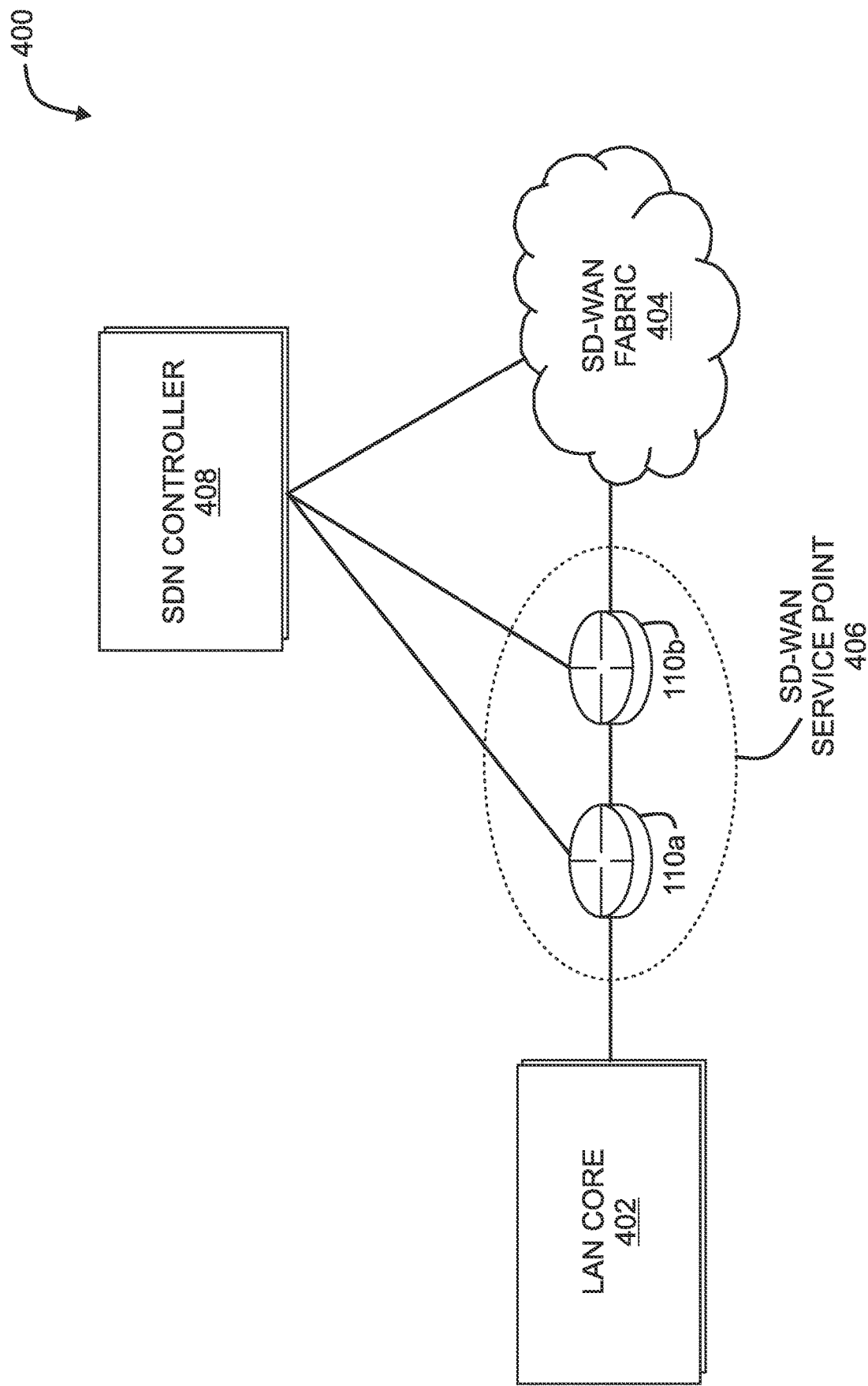
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamnicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
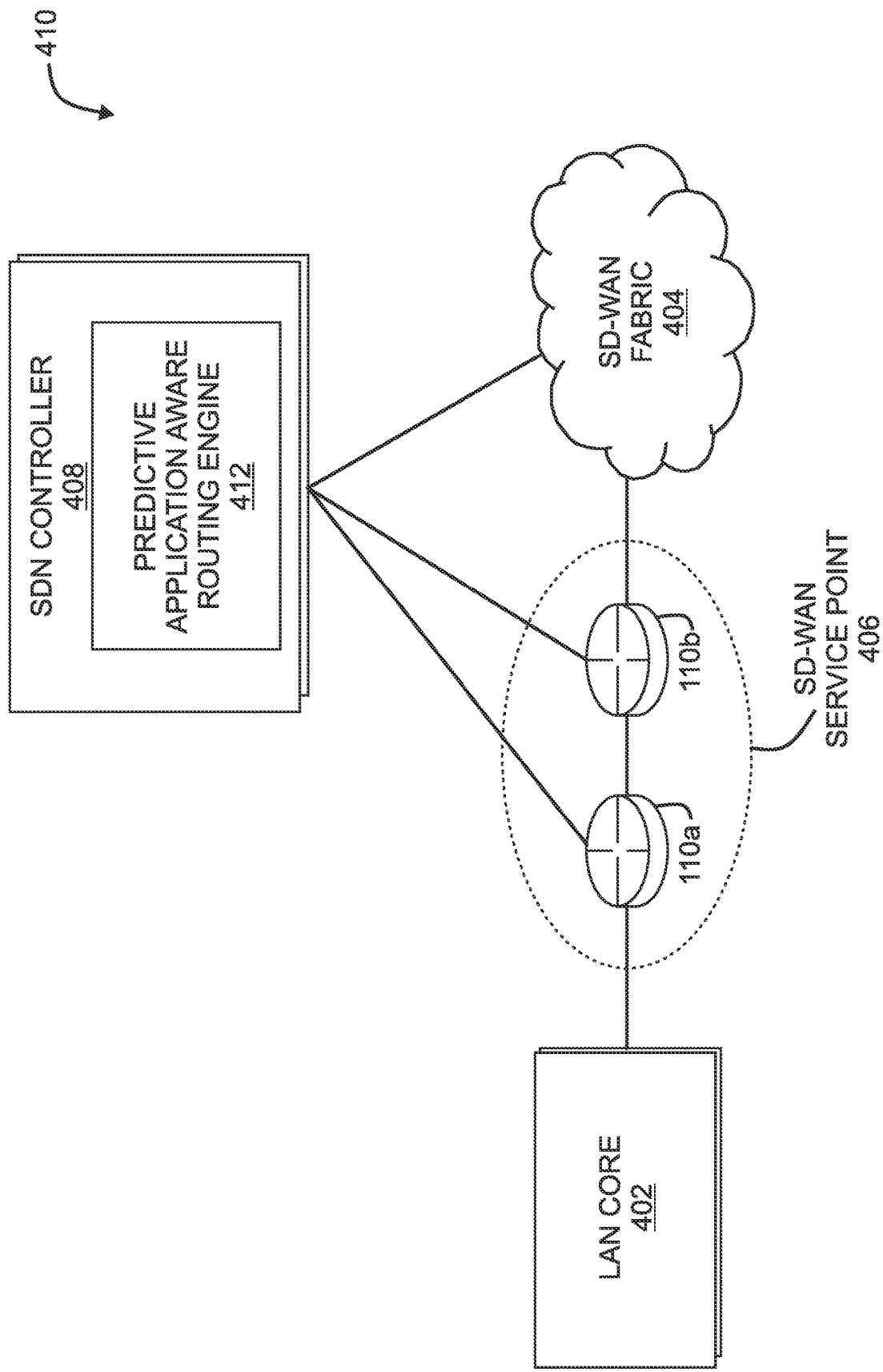

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD- WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g., often referred to as layer violation) to be avoided, at a time where a number of protocols and technologies were developed at each layer. More specifically, the Open Systems interconnection (OSI) model divides networks into seven networking layers:

1. The Physical (PHY) Layer—the layer representing the physical connections between devices
2. The Data Link Layer—e.g., the layer at which MAC addressing is used
3. The Network Layer e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g., PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

In summary, cognitive networks represent an evolution over existing networking techniques by focusing on the true user experience/QoE of an online application, rather than attempting to infer this information from proxy information, such as SLA violations (e.g., real SLA violations detected in the network or SLA violations predicted by a predictive network system). The scope of cognitive networks is also not specific to just voice and video applications and can be expanded to other types of applications, as well.

As noted above, in recent years, enterprise environments have undergone a fundamental transformation driven by both advances in technology and social factors (such as the COVID pandemic) resulting in users and applications becoming increasingly distributed and diverse. Critical business applications commonly run in a software, platform or infrastructure as a service model (XaaS) and are delivered from public or private cloud infrastructure. Solutions like AWS Outpost, Azure Stack Edge, or Google Distribute Edge make it easier than ever for application providers to leverage highly distributed and dynamic infrastructures. At the same time, the wide adoption of remote and hybrid work practices along with the advent of shared or temporary office space providers (e.g., WeWork, CoWorker, Instant Office, etc.) mean that users can now work from an increasing number of diverse locations.

Application performance and user QoE are top-of-mind concerns for network administrators. However, the current set of network solutions and practices have been slow to adapt to this new highly dynamic environment. In the case of traditional on-prem networks, physical devices (e.g., routers, switches, firewalls) are installed in predetermined locations (e.g., offices, branches, data centers) and dimensioned for peak traffic load forecasted over multi-year time horizons (e.g., 3, 5, 7 years). This approach can lead to wasted resources, as devices run underutilized at least for the first few years, as well as overall rigid network architectures that have a hard time adjusting to changes. For example, a significant shift in traffic patterns, such as the one caused by migrating a critical application from a local data center to a cloud environment may result in some parts of the network being underutilized while others are congested and causing poor user experience. Resolving the congestion and restoring QoE may then be dependent on time-consuming and costly hardware upgrades.

In the case of remote workers, traffic for business applications is typically routed through a small number of corporate VPN gateways located in a data centers or hub locations. This type of solution may often see user QoE being impacted by suboptimal gateway placement or capacity issues caused by the system being unable to quickly scale up to meet traffic demands. More recent technologies like SD-WAN, secure agile exchange (SAE) or secure access service edge (SASE)-enabled functions such as SLA Monitoring (via bidirectional forwarding detection or HTTP probes) and Application Aware Routing (AAR) allow network connectivity to be optimized from the perspective of Layer 3 network metrics, such as loss, latency, and jitter. Some key limitations of these technologies are that: 1.) SLA profiles based on Layer 3 metrics may often not be representative to true subjective user satisfaction/QoE and 2.) traffic can only be optimized in the confines of the existing network topology (e.g., via already available nodes).

QoE Optimized Elastic Cloud Networks

The techniques herein expand the scope of cognitive networks with that of a QoE-driven elastic cloud network topology manager. In some aspects, the introduced system makes use of public and private cloud infrastructure to build and maintain completely virtualized network topologies with the goal of increasing application performance and user QoE while at the same time managing the overall cost. The number of available network nodes, their placement as well as their size and capacity are continuously evaluated, and adjustments are dynamically made to optimize the overall network architecture. For example, the system may dynamically spin up new network nodes closer to groups of users working on a new project, temporarily scale up nodes in a region because of increased user demand after an application failover, scale down or completely decommission nodes outside business hours or whenever they are not needed anymore, as a result of traffic patterns changing.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device obtains information regarding a plurality of network nodes of a network via which an online application is accessed. The device uses a prediction model to predict a quality of experience metric for the online application. The device determines, a topology change for the network, based on the quality of experience metric predicted for the online application and the information regarding the plurality of network nodes. The device causes the topology change to be implemented in the network.

Figure 5:
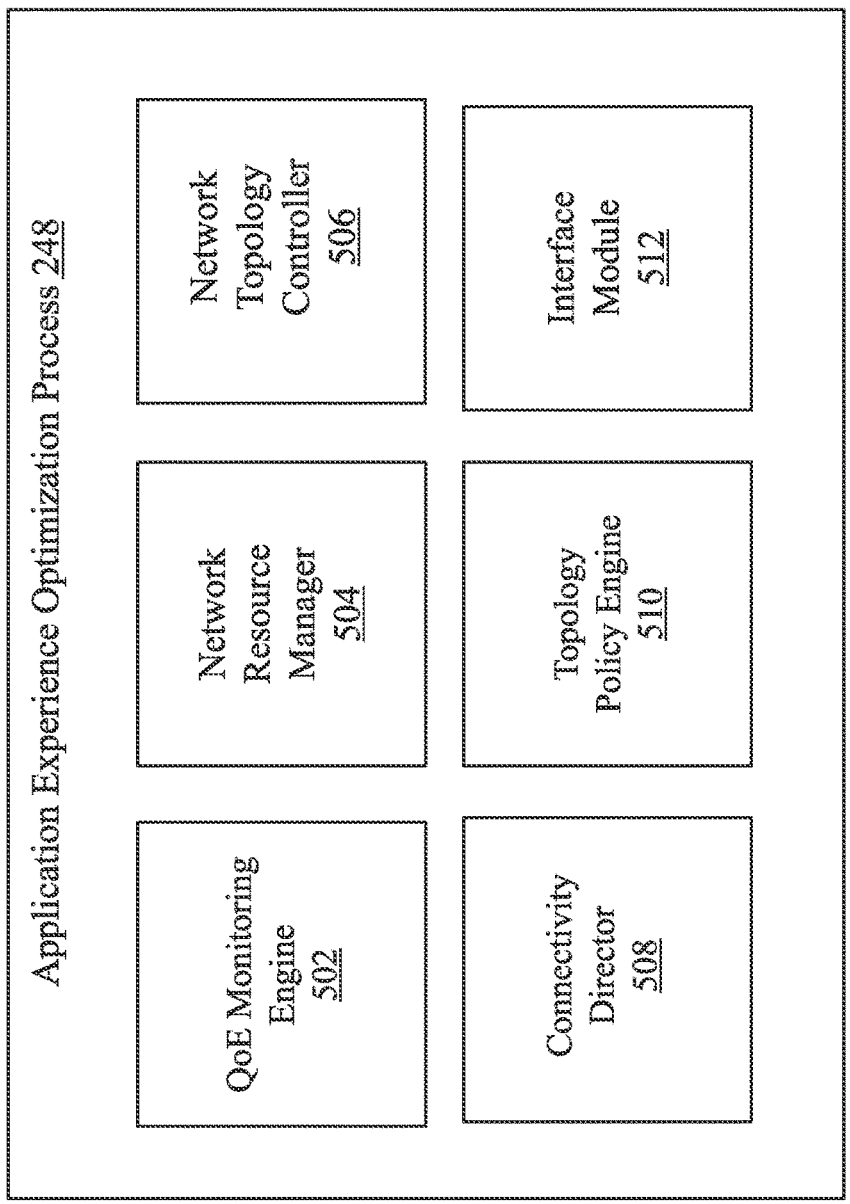
FIG. 5 illustrates an example architecture for implementing quality of experience (QoE) optimized elastic cloud networks.

Operationally, FIG. 5 illustrates an example architecture 500 for measuring performance in cognitive networks, according to various embodiments. At the core of architecture 500 is application experience optimization process 248, which may be executed by a controller for a network or another device in communication therewith. For instance, application experience optimization process 248 may be executed by a controller for a network (e.g., SDN controller 408 in FIGS. 4A-4B, such as part of predictive application aware routing engine 412), a particular networking device in the network (e.g., a router, a firewall, etc.), a server, another device or service in communication therewith, or the like.

As shown, application experience optimization process 248 may include any or all of the following components: a QoE monitoring engine 502, a network resource manager 504, a network topology controller 506, a connectivity director 508, a topology policy engine 510, and/or an interface module 512. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

Figure 6:
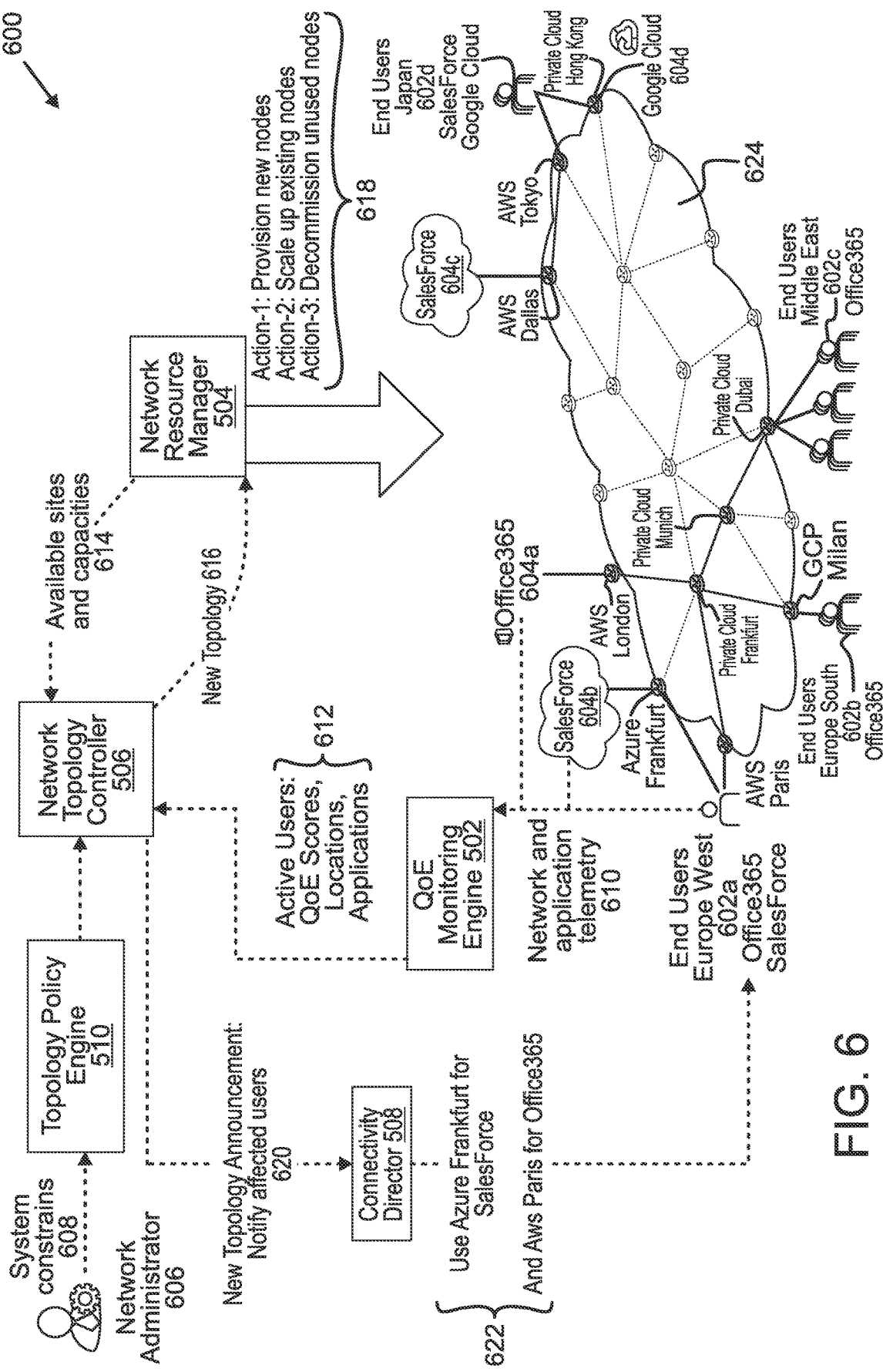
FIG. 6 illustrates an example of the interactions of the components of the architecture of FIG. 5.

To better illustrate the interactions of the components of application experience optimization process 248, FIG. 6 shows an example 700 of application experience optimization process 248 providing control over a network 624, to optimize the QoE of various cloud-hosted applications accessible via network 624. For instance, such applications may include a first application 604a (Office365), a second application 604b (e.g., a first instance of Salesforce), a third application 604c (e.g., a second instance of Salesforce), a fourth application 604d (e.g., Google Cloud), etc. Distributed across network 624 may be any number of users at different locations that access the various applications 604*a*-604*c*. For instance, there may be a first set of users 602*a* located in western Europe that use both Office365 and Salesforce, a second set of users 602*b* located in southern Europe that use Office365, a third set of users 602*c* in the Middle East that use Office365, and a fourth set of users 602*d* that use both Salesforce and Google Cloud.

In various implementations, QoE monitoring engine 502 may be responsible for collecting network and application telemetry 610 and inferring application QoE scores for each user present in the network, such as users 602*a*-602*d* in network 624. To do so, QoE monitoring engine 502 may rely on a custom application programming interface (API) to integrate with, and collect, telemetry 610 from a variety of different of sources such as any or all of the following:

- SDN controllers: e.g., vManage, vAnalytics or DNA-C
- Cloud provider monitoring dashboards in the form of AWS Network Manager, Google Network Hub, etc.
- Endpoint telemetry agents like Thousand Eyes Endpoint Agent, which facilitates the collection of telemetry directly on end user devices.
- Application vendors via direct APIs, such as those provided by Webex control center, Zoom Dashboard, or by using application performance monitoring (APM) tools like AppDynamics or Datadog, in the case of a custom application.

Figure 7:
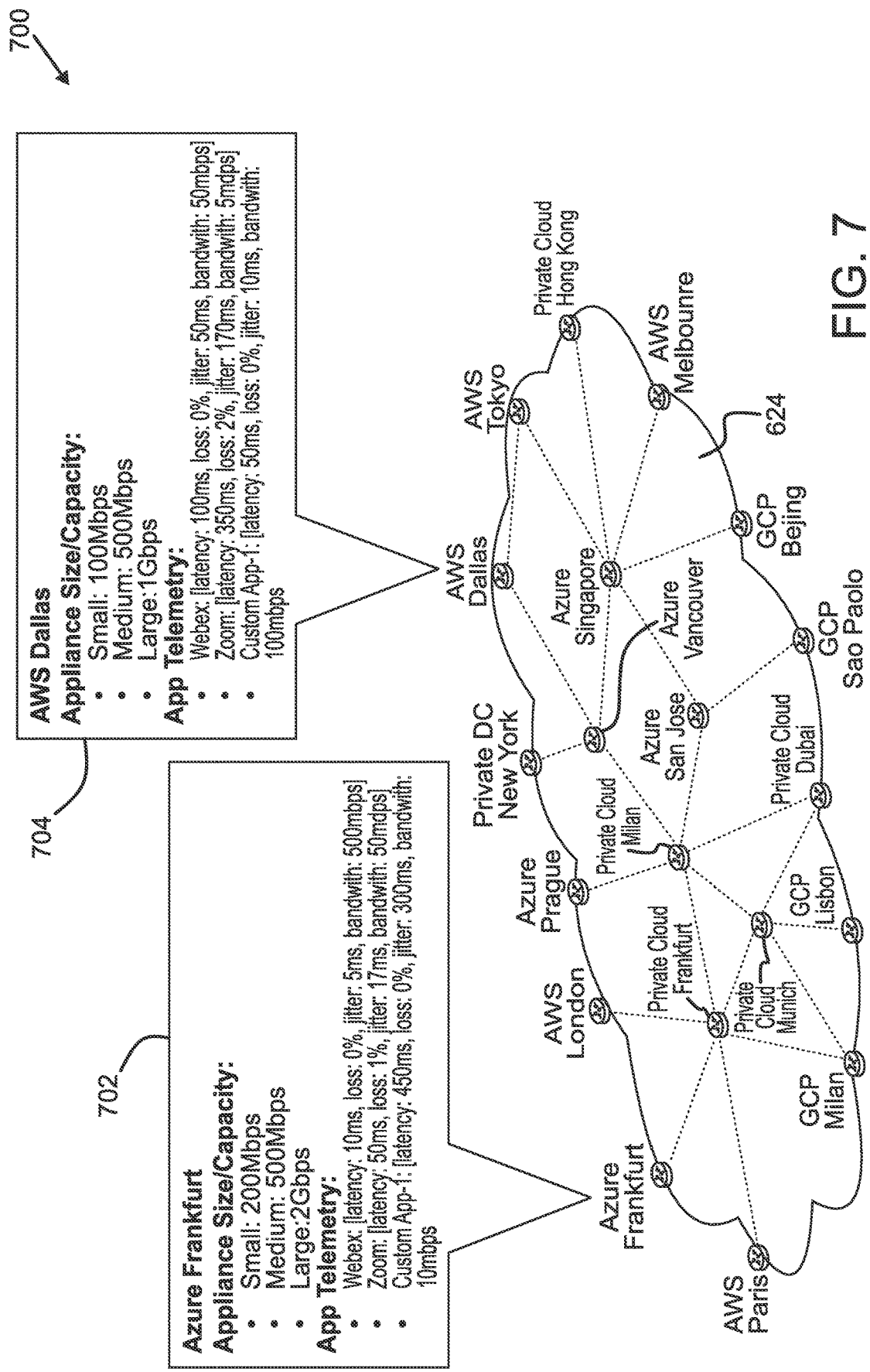
FIG. 7 illustrates an example of collected location information.

For each user and application, QoE monitoring engine 502 may build a time series to record and report information 612 such as, but not limited to, any or all of the following:

- User metadata: location, public and/or private IP address, etc.
- Application volume of traffic in a particular time interval
- Application destination (range of IP address, region, datacenter)
- Available network paths:
  - WAN circuit types (broadband, ADSL, 4G/5G, satellite),
  - Path capacity and network characteristics (loss, latency, jitter)
- Application QoE scores inferred using pre-trained machine learning models, such as a cognitive network model configured to predict the QoE of an application based on its cross-layer telemetry In various embodiments, network resource manager 504 may perform several important tasks. First, network resource manager 504 may compile a database of locations where provisioning network nodes is possible and makes it available to downstream components via notifications 614. Such locations can take the form of public cloud provider points-of-presence (PoPs) or edge locations (AWS, Azure, GCP, etc.), colocation centers (e.g., Equinix, Telehouse) or already existing private cloud or data center enterprise sites. By way of example, FIG. 7 illustrates an example 700 of location information that network resource manager 504 may collect and store. For instance, network resource manager 504 may create a record 702 for Azure in Frankfurt and a record 704 for Amazon Web Services (AWS) in Dallas.

For each potential network node location, network resource manager 504 may record details such as:

- Available node sizes (small, medium, large, etc.) and expected forwarding capacity.
- Cost associated with running each node size for a particular unit of time (minute, hour, day)
- Network performance metrics for various applications. These metrics may be derived in various ways, such as actual user traffic (once the nodes are instantiated and utilized) or employing dedicated agents to perform synthetic measurements between the location and applications of interest.

Secondly, network resource manager 504 may be responsible for performing life cycle management for network elements based on the requirements of downstream modules such as network topology controller 506. To this end, as shown in FIG. 6, network topology controller 506 may send a new topology request 616 to network resource manager 504 to provision new network nodes, scale up or down existing ones and decommission nodes that are no longer used.

Since network resource manager 504 is a specialized type of Virtual Infrastructure Manager (VIM), it can make use of native scale up/down techniques such as horizontal scaling, where multiple devices are instantiated side by side or vertical scaling where the device resources are increased to meet capacity. These can be further augmented by traffic forwarding mechanisms such as equal cost multipath (ECMP) load balancing or make before break (MBB) path signaling to provide seamless capacity adjustments which are transparent to end users.

According to various implementations, application experience optimization process 248 may also include network topology controller 506 whose role it is to dynamically adjust the network topology with the end goal of optimizing end user QoE. To achieve its goal, network topology controller 506 may first create application requirement profiles by inspecting pre-trained QoE models, such as those trained using the cognitive networking techniques above, to derive a list of important performance metrics for each type of application. For example, interactive collaboration applications may require that latency and jitter remain within specific ranges, while packet loss and throughput may be more important for end user QoE for web-based applications.

Network topology controller 506 may also leverage information 612 collected by QoE monitoring engine 502 to discover the number of active users for each application, their placement in relation to already instantiated network nodes, as well as their throughput requirements and QoE scores. In some instances, network topology controller 506 may further utilize a clustering algorithm to aggregate telemetry across groups of users based on proximity and application requirements.

Next, network topology controller 506 may execute an optimization algorithm that takes as input: 1.) the location of users and application endpoints, 2.) application requirements as they pertain to QoE, and 3.) potential network locations as per notifications 614 from the database of network resource manager 504. For each application of interest, the objective goal may be to optimize network characteristics with most influence on end user QoE (loss, throughput, jitter, etc.), as defined by the application requirements profiles. As would be appreciated, any suitable optimization algorithm may be used, as desired.

In a final step, network topology controller 506 merges the individual, per-application topologies into a common topology and calculates the required size for each node (based on the cumulated usage volumes). In turn, it may send the new topology request 616 to network resource manager 504 for implementation. Network resource manager 504 may then compare the current and expected state of each node (as per the new received topology definition) and implement the appropriate changes by performing a set of actions 618. For instance, actions 618 may include, but are not limited to, spinning up new nodes, decommissioning ones that are no longer needed, etc., scaling up or down based on capacity requirements.

Figure 8:
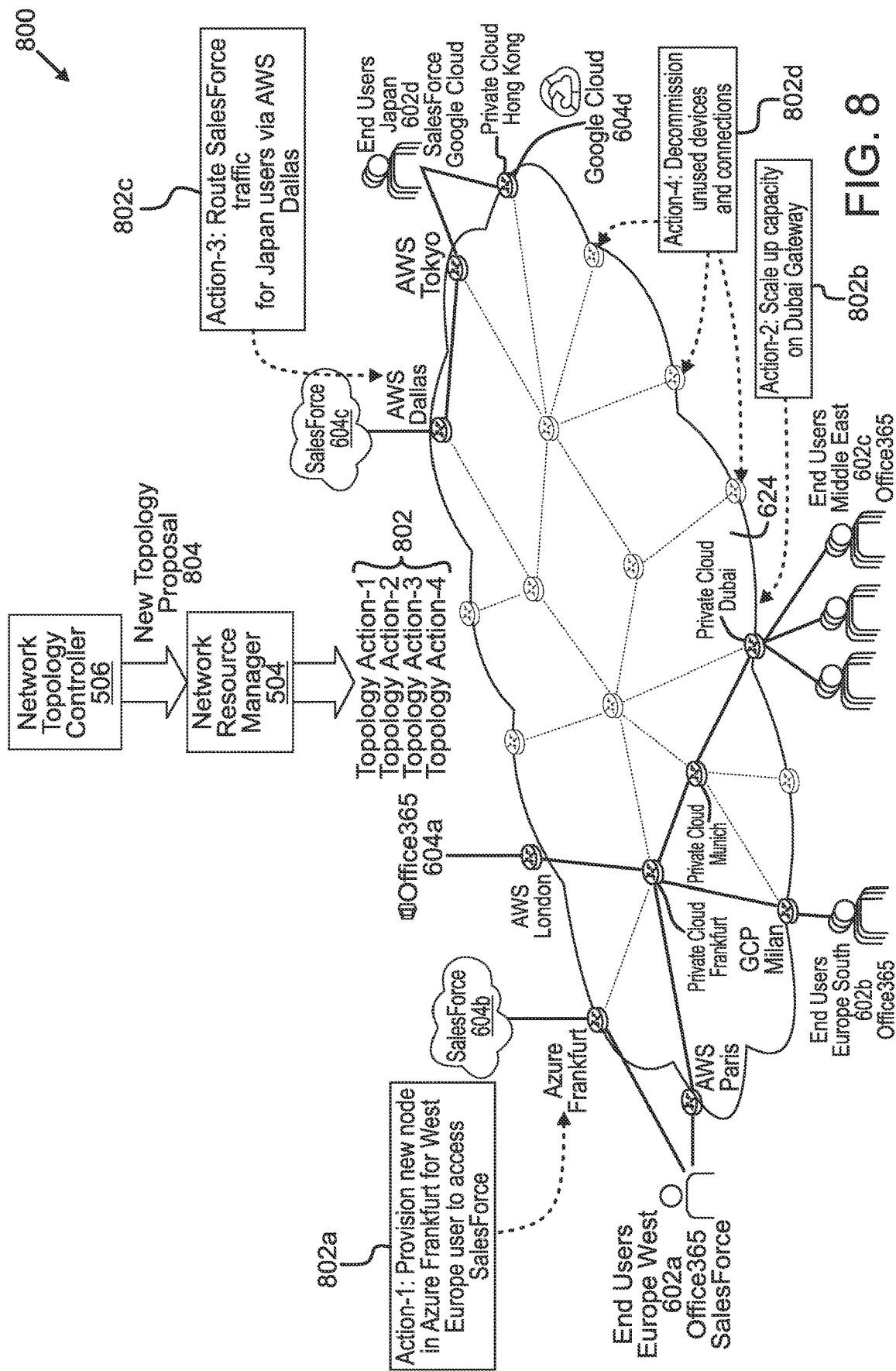
FIG. 8 illustrates an example of adjusting an elastic cloud network to improve application QoE.

FIG. 8 shows an example 800 of the interactions of network topology controller 506 and connectivity director 508 to improve the QoE of applications 604a-604d in greater detail. As shown, network topology controller 506 may send a new topology 804 to network resource manager 504 as a proposed topology. In turn, network resource manager 504 may devise a set of actions 802. Preferably, network topology controller 506 interacts with a predictive mechanism (e.g., QoE monitoring engine 502) that is able to forecast the QoE and other network metrics in advance, allowing network topology controller 506 and network resource manager 504 to pre-provision network resources in network 624 in advance of them being needed.

For instance, the set of actions 802 may include actions 802a-802d, shown in FIG. 8. Action 802a provisions a new node in Azure Frankfurt for the set of users 602a in Western Europe to access second application 604b (e.g., Salesforce). Action 802b scales up capacity on a gateway in Dubai, thereby improving the QoE for the set of users 602c located in the Middle East. Action 802c routes Salesforce traffic for the set of users 602d in Japan via AWS Dallas, thereby improving their QoE when accessing Salesforce. Finally, action 802d decommissions unused devices and connections in network 624, so as to conserve unneeded resources.

Referring again to FIGS. 5-6, connectivity director 508 may be responsible for informing end user endpoints as to which network node(s) they should use to forward application traffic at any point in time. For instance, connectivity director 508 may receive a notification 620 from network topology controller 506 regarding the new topology requested by new topology request 616 and, in turn, send a notification 622 to the endpoint devices associated with first set of users 602a. By way of example, notification 622 may instruct those endpoint devices to use Azure Frankfurt for Salesforce and AWS Paris for Office365. In one embodiment, topology changes are communicated to end users or edge network devices via a locally installed agent which then establishes the required network paths (tunnels) and switches the traffic over to the new path(s)/tunnel(s). In another embodiment, connectivity director 508 may implement end-user and traffic steering policies directly on an SDN controller (e.g., SDN controller 408 in FIGS. 4A-4B) without the need of dedicated endpoint agents.

In various implementations, topology policy engine 510 may allow a network administrator to define additional constrains to the system operation. For instance, a network administrator 606 may specify system constraints 608 via a user interface to topology policy engine 510. For instance, network administrator 606 may use topology policy engine 510 to define parameters such as:
  The number of optimization cycles and windows: how often network topology controller 506 should try to optimize the network topology and whether changes need to be performed during specific time intervals.
  Cost budged: maximum resource cost of the proposed topology as an absolute value (e.g., the cost sum of all resources in the proposed topology must be under a specific value) or as a relative increase to an average cost (e.g., the new proposed topology must not exceed the current or average cost by more than 15%).
  Capacity overhead: should the system provision any extra capacity on top of the expected traffic load.
  Redundancy strategy: should new nodes be provisioned in a redundant manner (more cost).
  Infrastructure provider details: network resource manager 504 may provide out of the box a list of infrastructure providers such as popular public cloud or colocation vendors. However, details of private resources (e.g., enterprise data centers) may need to be manually added. In other cases, the network administrator may need to restrict the use of some infrastructure vendors due to regulatory (not being compliant to certain security or data compliance standards) or business-related reasons (competing business entities).

The constrains defined by a network administrator with the help of topology policy engine 510 are then feed back into network topology controller 506 and used during the topology generation phase.

Figure 9:
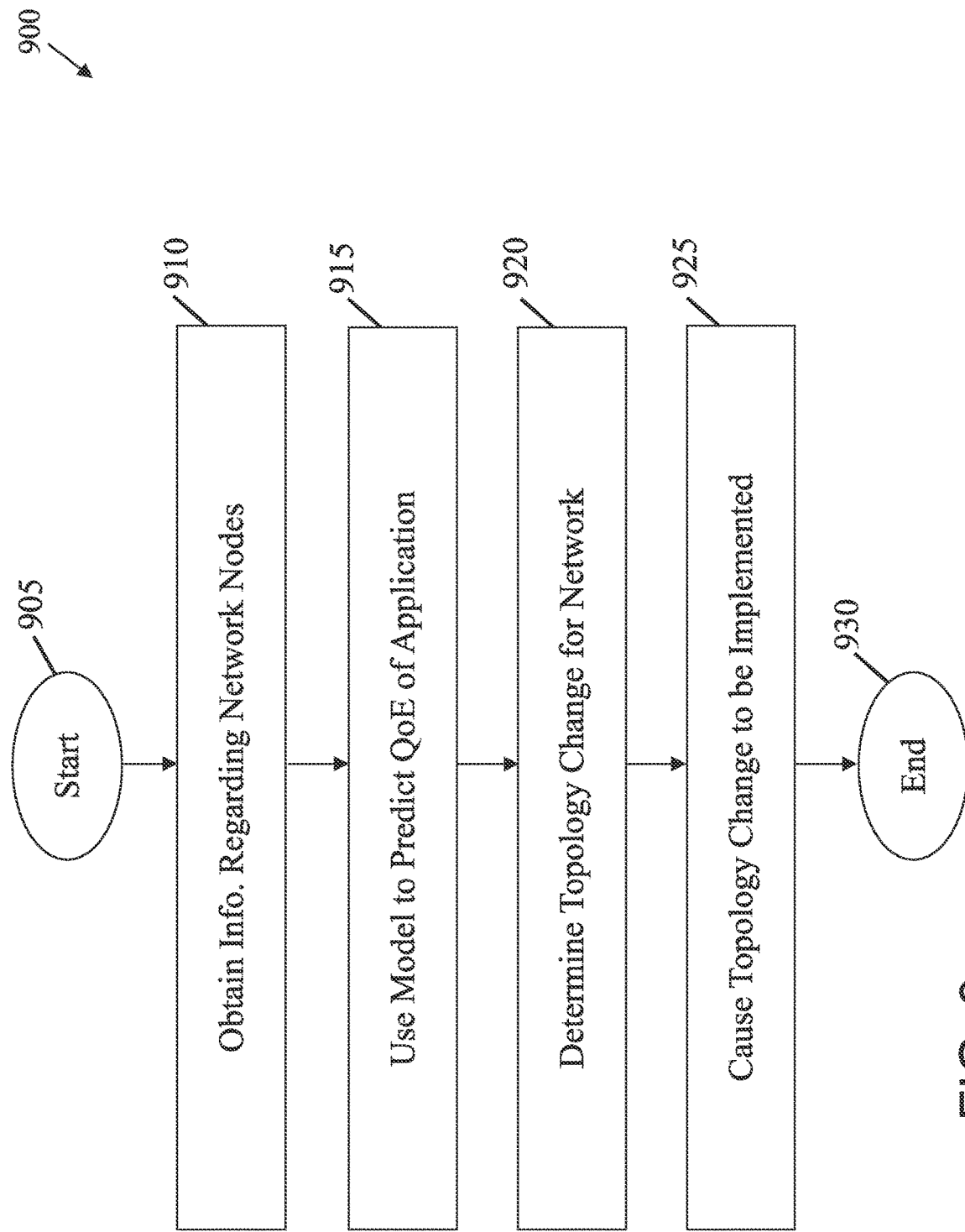
FIG. 9 illustrates an example simplified procedure for optimizing application QoE in an elastic cloud network.

In some implementations, as shown in FIG. 5, a final component of application experience optimization process 248 may be interface module 512, which could take the form of a user interface or API that allows a network administrator to inspect various aspects of the system operation such as:
  Optimization history in the form of previous and current network topologies
  Evolution of QoE scores for individual users and applications, as well as aggregated at various levels (city, country, geography, ISP, infrastructure provider)
  Network resource cost evolution over time FIG. 9 illustrates an example simplified procedure 900 (e.g., a method) for optimizing application QoE in an elastic cloud network, in accordance with one or more embodiments described herein. For example, a non-generic, specifically configured device (e.g., device 200), such as a router, firewall, controller for a network (e.g., an SDN controller or other device in communication therewith), server, or the like, may perform procedure 900 by executing stored instructions (e.g., application experience optimization process 248). In some instances, a set of distributed, specifically configured devices may also perform procedure 900, in which case the set of devices can themselves be viewed as a singular device for purposes of the teachings herein. The procedure 900 may start at step 905, and continues to step 910, where, as described in greater detail above, the device may obtain information regarding a plurality of network nodes of a network via which an online application is accessed. In some cases, the device may also obtain information regarding a particular network node available to be added to the plurality of network nodes via which the online application may be accessed.

At step 915, as detailed above, the device may use a prediction model to predict a quality of experience metric for the online application. In various instances, the prediction model may do so based on telemetry from the network and on telemetry accessed from the online application via an application programming interface.

At step 920, the device may determine a topology change for the network, based on the quality of experience metric predicted for the online application and the information regarding the plurality of network nodes, as described in greater detail above. In various implementations, the device determines the topology change for the network based further on information regarding locations of endpoint users that access the online application via the network. In another implementation, the device determines the topology change based further on one or more constraints specified by an administrator via a user interface. In some instances, the one or more constraints comprise at least one of: a frequency at which the device is to assess whether the network requires any topology changes, a redundancy strategy, a maximum resource cost, or an extra capacity parameter.

At step 925, as detailed above, the device may cause the topology change to be implemented in the network. In some instances, the topology change in the network comprises scaling up a new network node in the network. In such cases, the device may also send an instruction to an endpoint device to access the online application via the new network node. In further instances, the topology change in the network comprises decommissioning at least one of the plurality of network nodes. In one implementation, the topology change causes traffic associated with the online application to be rerouted in the network.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for quality of experience (QoE) optimized elastic cloud networks, it is to be understood that various other adaptations and modifications may be made within the spirit and scope of the embodiments herein. For example, while certain embodiments are described herein with respect to using certain models for purposes of predicting application experience metrics (e.g., QoE metrics), SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, information regarding a plurality of network nodes of a network through which traffic associated with an online application flows;
using, by the device, a prediction model to predict a quality of experience metric for the online application;
determining, by the device, a routing topology change for the network, based on the quality of experience metric predicted for the online application and the information regarding the plurality of network nodes; and
causing, by the device, the routing topology change to be implemented in the network.

2. The method as in claim 1, wherein the routing topology change in the network comprises scaling up a new network node in the network.

3. The method as in claim 2, further comprising:
sending an instruction to an endpoint device to access the online application via the new network node.

4. The method as in claim 1, wherein the routing topology change in the network comprises decommissioning at least one of the plurality of network nodes.

5. The method as in claim 1, wherein the device determines the routing topology change for the network based further on information regarding locations of endpoint users that access the online application via the network.

6. The method as in claim 1, wherein the device determines the routing topology change based further on one or more constraints specified by an administrator via a user interface.

7. The method as in claim 6, wherein the one or more constraints comprise at least one of: a frequency at which the device is to assess whether the network requires any routing topology changes, a redundancy strategy, a maximum resource cost, or an extra capacity parameter.

8. The method as in claim 1, further comprising:
obtaining, by the device, information regarding a particular network node available to be added to the plurality of network nodes via which the online application may be accessed.

9. The method as in claim 1, wherein the quality of experience metric is predicted based on telemetry from the network and on telemetry accessed from the online application via an application programming interface.

10. The method as in claim 1, wherein the plurality of networking nodes comprises a plurality of network routers or switches and the routing topology change causes traffic associated with the online application to be rerouted in the network.

11. An apparatus, comprising:
one or more network interfaces;
a processor coupled to the one or more network interfaces and configured to execute one or more processes; and
a memory configured to store a process that is executable by the processor, the process when executed configured to:
obtain information regarding a plurality of network nodes of a network through which traffic associated with an online application flows;
use a prediction model to predict a quality of experience metric for the online application;
determine a routing topology change for the network, based on the quality of experience metric predicted for the online application and the information regarding the plurality of network nodes; and
cause the routing topology change to be implemented in the network.

12. The apparatus as in claim 11, wherein the routing topology change in the network comprises scaling up a new network node in the network.

13. The apparatus as in claim 12, wherein the process when executed is further configured to:
send an instruction to an endpoint device to access the online application via the new network node.

14. The apparatus as in claim 11, wherein the routing topology change in the network comprises decommissioning at least one of the plurality of network nodes.

15. The apparatus as in claim 11, wherein the apparatus determines the routing topology change for the network based further on information regarding locations of endpoint users that access the online application via the network.

16. The apparatus as in claim 11, wherein the apparatus determines the routing topology change based further on one or more constraints specified by an administrator via a user interface.

17. The apparatus as in claim 16, wherein the one or more constraints comprise at least one of: a frequency at which the apparatus is to assess whether the network requires any routing topology changes, a redundancy strategy, a maximum resource cost, or an extra capacity parameter.

18. The apparatus as in claim 11, wherein the process when executed is further configured to:
obtain information regarding a particular network node available to be added to the plurality of network nodes via which the online application may be accessed.

19. The apparatus as in claim 11, wherein the quality of experience metric is predicted based on telemetry from the network and on telemetry accessed from the online application via an application programming interface.

20. A tangible, non-transitory, computer-readable medium storing program instructions that cause a device to execute a process comprising:
obtaining, by a device, information regarding a plurality of network nodes of a network through which traffic associated with an online application flows;
using, by the device, a prediction model to predict a quality of experience metric for the online application;
determining, by the device, a routing topology change for the network, based on the quality of experience metric predicted for the online application and the information regarding the plurality of network nodes; and
causing, by the device, the routing topology change to be implemented in the network.

* * * * *